(12) United States Patent
Murray et al.

(10) Patent No.: US 6,367,331 B1
(45) Date of Patent: Apr. 9, 2002

(54) METHOD OF FORMING A SEAL

(75) Inventors: Holt Apgar Murray, Hopewell; William Ross Conover, Allenhurst, both of NJ (US)

(73) Assignee: TyCom (US) Inc., Morristown, NJ (US)

( * ) Notice: Subject to any disclaimer, the term of this patent is extended or adjusted under 35 U.S.C. 154(b) by 0 days.

(21) Appl. No.: 09/421,288

(22) Filed: Oct. 20, 1999

(51) Int. Cl.[7] .............................. G01N 29/00; B23B 3/00
(52) U.S. Cl. .............................. 73/599; 73/600; 73/602; 82/1.11
(58) Field of Search .......................... 73/599, 587, 600, 73/620, 623, 627, 801, 602, 622; 82/1.11

(56) References Cited

U.S. PATENT DOCUMENTS

| | | | | |
|---|---|---|---|---|
| 4,297,607 A | * | 10/1981 | Lynnworth et al. | 310/334 |
| 4,520,672 A | * | 6/1985 | Saint-Amour | 73/622 |
| 4,530,078 A | * | 7/1985 | Lagakos et al. | 367/149 |
| 4,577,487 A | * | 3/1986 | Dooley | |
| 4,592,236 A | * | 6/1986 | Battagin et al. | 73/602 |
| 5,979,222 A | * | 11/1999 | Manalio | 73/37 |
| 6,065,345 A | * | 5/2000 | Holenstein et al. | 73/660 |
| 6,112,599 A | * | 9/2000 | Maki, Jr. | 73/801 |

* cited by examiner

Primary Examiner—Hezron Williams
Assistant Examiner—Jacques Saint-Surin

(57) ABSTRACT

A method is provided for obtaining dimensional accuracy in a seal assembly. The seal assembly includes a substrate comprised of a material that reflects ultrasonic waves. The seal assembly also includes a deformable sealant material that may, for example, surround the substrate. The method can include ultrasonically measuring a thickness of the sealant between a face of the sealant and a surface of the substrate. The thickness of the sealant is reduced if it exceeds a predetermined value.

18 Claims, 10 Drawing Sheets

METHOD OF FORMING A SEAL

CROSS-REFERENCES TO RELATED APPLICATIONS

This invention relates to the following co-pending application, which is incorporated by reference:

"Transducer Holding Device", Ser. No. 09/421285, filed Oct. 20, 1999.

FIELD OF THE INVENTION

The present invention relates to assuring the thickness of a sealant. More specifically, the invention relates to using ultrasonic techniques to determine the thickness of a sealant.

BACKGROUND OF THE INVENTION

Submarine fiber optic communication systems carry a large majority of the information that is transmitted between the world's continents. These fiber optic communication systems remain in-place on the bottom of the ocean under thousands of feet, and even miles, of water for years at a time. Due to the difficulties encountered when having to repair, replace, or generally service these systems, it is desirable that these systems be highly reliable.

Submarine fiber optic communication systems typically include repeaters that appear at regular intervals along the spans of undersea cables to amplify the optical signals traversing the constituent fibers. Other assemblies that may be found along a submarine communication system including branching units, which allow multiple cable stations to be served from a single cable. To protect the sensitive components and/or connections that are housed within these submerged assemblies, a rugged hermetically sealed structure must be employed.

FIG. 1 illustrates a cross-sectional view of a known submarine fiber optic communication device 10. Communication device 10 can be surrounded by seawater 12, and can be connected to other submarine fiber optic transmission devices (not shown) or to terminal units (not shown). Device 10 can be formed as a cylindrical container 14. Once the internal optical components (not shown) are installed within cylinder 14, an end cover 16 can be attached onto each of its longitudinal ends. Each transmission device end cover 16 can define a seal well 80 having an aperture that penetrates cover 16. Each seal well 80 can surround a seal assembly 100. An external communications cable 20 can connect to each seal assembly 100.

FIG. 2 provides a cross-sectional view of seal assembly 100, within which external communications cable 20 can be connected to internal communications cable 36. External communications cable 20 can contain an external secondary jacket 22 which can surround an external fiber shield 24 through which optical fibers 38 can pass. External guide tube 24 can be connected to tube 28, which can be connected to internal guide tube 34. Thus, a continual chamber 40 can be formed through which optical fibers 38 can pass from the outside to the inside of device 10 (not shown in FIG. 2). Internal guide tube 34 can be surrounded by internal secondary jacket 32.

Seal assembly 100 can have a circular cross-section, and can include an elongated annular plunger 110 having plunger front face 112, plunger rear face 114, and plunger circumferential face 116. Seal assembly 100 can also include an elongated annular disk 120 having disk front face 122, disk rear face 124, and disk circumferential face 126. Although plunger 110 and disk 120 can be coaxial, plunger 110 can have a larger outer diameter than disk 120.

Sealant 130 can be attached to, and formed simultaneously with, internal secondary jacket 34 and external secondary jacket 22. Sealant 130 can also be molded over disk front face 122 and disk rear face 124 of disk 120, as well as around circumference 126 of disk 120, to form encased disk 140. Encased disk 140 can be coaxial with disk 120, and can define sealant front face 142, sealant rear face 144, and sealant circumferential face 146. Plunger front face 112 can be attached to sealant rear face 144, such that plunger 110 and encased disk 140 are coaxial. A sufficient amount of sealant 130 can be removed from the circumference of encased disk 140 so that sealant circumferential face is flush with plunger circumferential face.

Plunger 110 and disk 120 can be constructed of any material that can withstand the loads anticipated to be imparted thereon. Sealant 130 can be constructed of polyethylene. Alternatively, sealant 130 can be constructed of any dielectric material that can sufficiently deform under preselected pressures to form a seawater seal.

FIG. 3 shows a cross-sectional view of seal assembly 100 installed in seal well 80. Seal assembly 100 can be installed in seal well 80 with rear face 114 of plunger 110 facing seaward. Seal well 80 can define well base 82 across its annular bottom, and well surface 84 along its inner circumference. Sealant front face 142 can contact well base 82 to form primary seal 150. Sealant circumferential face 146 can contact well surface 84 to form secondary seal 160.

Primary seal 150 and secondary seal 160 can be formed by applying pressure to sealant 130. Although this pressure can be supplied by the hydrostatic pressure of seawater 12 bearing against the rear face of plunger 110, it can be desirable to create at least primary seal 150 during the manufacture of device 10. The load necessary to establish at least primary seal 150 can be provided by the force of spring 170 bearing upon plunger rear face 114. Spring 170 can be contained in seal well 80 by retaining ring 174, which can ride in a retaining ring groove 86 that is cut in seal well 80. The pressure of spring 170 can create an axial force against plunger rear face 114. From plunger 110, this force can be transferred onto sealant rear face 144, through sealant 130 and disk 120 and sealant 130 again, through sealant front face 142, and against well base 82. By bearing against well base 82, the sealant 130 of sealant front face 142 can slowly deform plastically to create initial primary seal 150. The force through sealant 130 can also cause sealant 130 to slowly deform to create initial secondary seal 160 between sealant circumferential face 146 and well surface 84. The force through sealant 130 can also cause any residual sealant 130 to flow into device 10.

When device 10 is lowered a sufficient depth into the sea, the hydrostatic pressure of seawater 12 can create sufficient additional force against plunger rear face 114, to again cause sealant 130 to plastically flow and deform. The force through sealant 130 can create, maintain, or enhance primary seal 150 and/or secondary seal 160.

The dimensions of the components of sealwell 80 and seal assembly 100 can be designed and specified to be compatible with the expected dimensions of communications cables 20 and 36, and the expected depth of operation of submarine fiber optic transmission device 10. However, because of the need to form highly reliable seals, it can be important to manufacture each of the components of seal well 80 and seal assembly 100 to a relatively high degree of dimensional accuracy. This importance can include the accuracy of the dimensions of encased disk 140. Notably, the portion of sealant 130 including and beneath sealant front face 142 can be removed to arrive at a reduced and desired sealant thickness between sealant front face 142 and disk front face 122. Likewise, the portion of sealant 130 including and beneath sealant front face 142 can be removed to arrive at a reduced and desired length for seal assembly 100.

FIG. 4 provides a cross-sectional view of seal assembly 100. Referring to FIG. 4, the distance from plunger rear face 114 to initial sealant front face 142' is illustrated as dimension A'. Likewise, the distance from plunger rear face 114 to reduced sealant front face 142" is illustrated as dimension A". The distance from disk front face 122 to initial sealant front face 142' is illustrated as dimension B'. Likewise, the distance from disk front face 122 to reduced sealant front face 142" is illustrated as dimension B". Note that initial sealant front face 142' and dimensions A" and B" are potential positions and dimensions of sealant 130 and are shown for illustrative purposes.

If either dimension A' or B' is under their respective specified value range, seal assembly 100 can be rejected. If either dimension A' or B' is over their respective specified value range, seal assembly 100 can be mounted on a lathe and machined to reduce the thickness of sealant 130 between sealant front face 142 and disk front face 122, thereby reducing dimensions A' and B' to dimensions A" and B", respectively. Then dimensions A" and B" can be measured. Similarly, if either dimension A" or B" is under the value specified, seal assembly 100 can be rejected. If either dimension A" or B" is over the value specified, an operator can again use the lathe to reduce dimensions A" and B". This process of measuring and reducing can be repeated as necessary.

Although dimensions A' and A" can be mechanically measured, because disk 120 can be completely surrounded by sealant 130, mechanical methods for measuring dimensions B' or B" can be destructive of sealant 130. Thus, dimensions B' and B" have traditionally been measured using x-rays.

FIG. 5 illustrates a cross-section of seal assembly 100 being subject to x-rays 180, that can be emitted by x-ray generator 182. X-rays 180 can pass through sealant 130 rather easily, thereby causing only a faint image on x-ray film 184. However, disk 120 and plunger 110 can block most or all of x-rays 180 from reaching x-ray film 184, thereby causing a heavy image on x-ray film 184. Thus, the resulting images on x-ray film 184 can be mechanically measured to provide approximate measurements of dimensions A', A", B' and B" (not shown in FIG. 5).

To increase the accuracy of these approximate measurements, several x-rays can be taken of seal assembly 100, each from a different angle, and the resulting measurements averaged. FIG. 6 shows an end view of seal assembly 100, and illustrates that the relative position of x-ray generator 182 with respect to seal assembly 100 can be rotated into numerous positions, including positions 182', 182", and 182'", each of which can be separated by approximately 60 degrees. Alternatively, the relative position of seal assembly 100 with respect to x-ray generator 182 can be rotated into similar positions. In either case, x-ray film 184 can be aligned to be perpendicular to the x-rays directed from x-ray generator 182.

However, even upon averaging a series of such x-ray measurements, this process provides limited measurement accuracy. Thus, if greater accuracy is desired, revisions to the process for determining the thickness of the sealant between the sealant front face and the disk front face are needed.

SUMMARY OF THE INVENTION

Embodiments of the present invention can provide a method for assuring a thickness of a sealant. The sealant can surround a substrate to define a seal assembly. The method can include ultrasonically measuring a thickness of the sealant between a face of the sealant and a surface of the substrate. The method can also include reducing the thickness of the sealant if the thickness of the sealant is greater than a predetermined value.

BRIEF DESCRIPTION OF THE DRAWINGS

The various features of the invention will best be appreciated by simultaneous reference to the description which follows and the accompanying drawings, in which.

DETAILED DESCRIPTION

Embodiments of the present invention can provide a method for assuring a thickness of a sealant. The sealant can surround a substrate to define a seal assembly. The method can include ultrasonically measuring a thickness of the sealant between a face of the sealant and a surface of the substrate. The method can also include reducing the thickness of the sealant if the thickness of the sealant is greater than a predetermined value.

As used herein, the term "sealant" includes any material having characteristics and properties suitable for sealing a penetration into a submergible assembly, such as, for example, a repeater used in an undersea fiber optic communication system, from seawater. For example, the sealant may be made of polyethylene, thermoplastic, rubber, and the like. The term "substrate" should be understood to include any object or structure that is surrounded by the sealant and which reflects ultrasonic waves. The term "face" includes any surface, planar or otherwise. The term "ultrasonically measuring" encompasses measurement by any acoustical device or collection of devices that emit and detect ultrasonic sound waves.

As indicated earlier, a known process for assessing the dimensional uniformity of a seal assembly involves passing x-rays perpendicular to the dimension being measured. However, even upon performing a series of such x-ray measurements, it has been discovered that this process is subject to substantial inaccuracies. Although in the past these inaccuracies were not recognized, and thus, did not cause concern, a recent emphasis on improving the reliability of the thickness measurement has brought identifying and resolving these inaccuracies to the fore. One major cause of these inaccuracies has now been discovered, and a method has been developed for substantially eliminating this and other causes, thereby substantially alleviating the resulting measurement inaccuracies.

Figure 7:
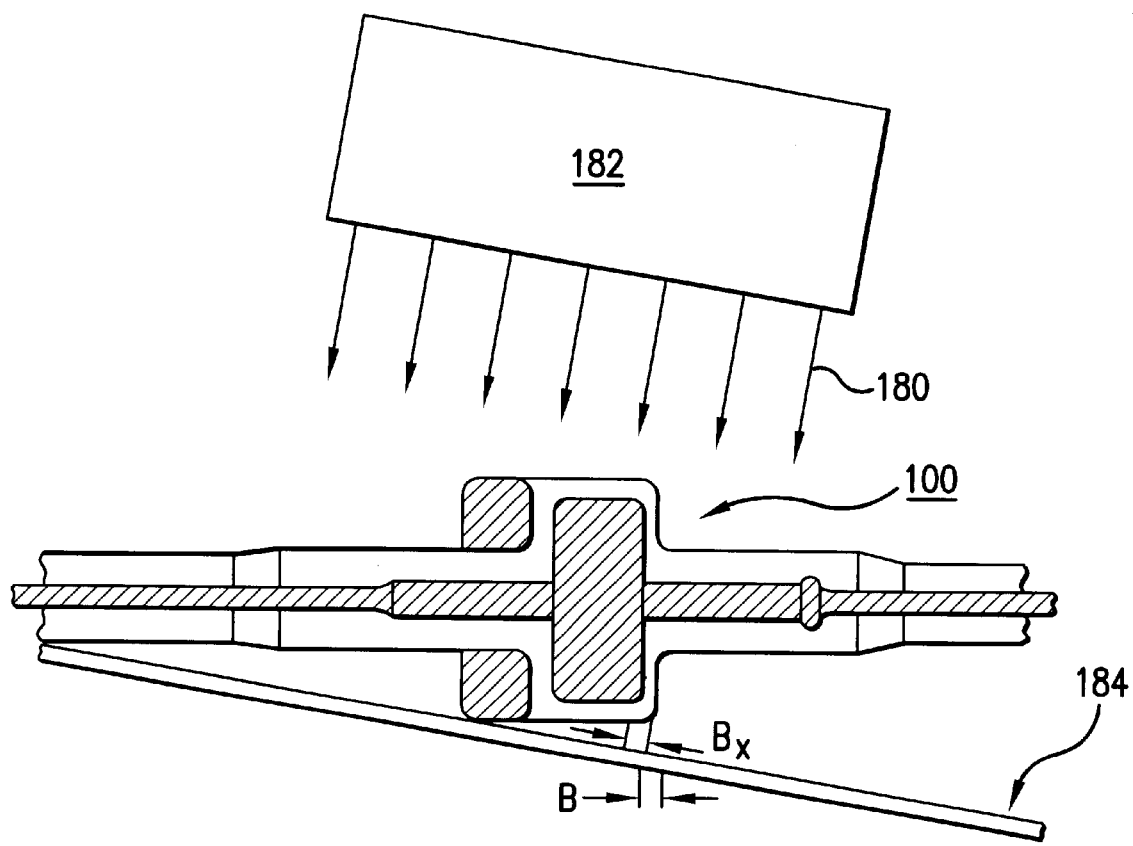
FIG. 7 is cross-sectional view of a known misaligned seal assembly receiving x-rays.

FIG. 7 provides a cross-sectional view of x-ray film 184 being exposed to x-rays 180 emitted by x-ray generator 182. X-ray film 184 can act as a receiver and recorder of the x-rays 180 transmitted by x-ray generator 182 that are not reflected away or absorbed by seal assembly 100. However, it has been discovered that the recorded dimensions of a seal assembly 100 under investigation can be substantially inaccurate due to a number of misalignment conditions. One such misalignment condition arises when the x-rays 180 passing through the seal assembly under inspection are not perpendicular to the surface of film 184. Another condition under which misalignment errors arise occurs when the components of seal assembly 100 are not coaxial. Yet another source of misalignment error is when the faces of the components of seal assembly are not parallel to x-rays 180, or when the axis of seal assembly 100 is not parallel to the surface of film 184. Moreover, it has been discovered that the misalignments can cause the measurement inaccuracies by virtue of a shadow effect, whereby the projected dimension of a surface (such as the disk circumferential face) exposed to x-rays 180 is different than the actual dimension of the surface. Thus, actual dimension B can appear on x-ray film 184 as apparent, yet inaccurate dimension $B_x$. Furthermore, it has been discovered that this inaccuracy can increase with increased misalignment. In addition, it has been discovered that when x-ray film 184 is separated from the sealant circumferential surface or the plunger circumferential surface, a magnification effect can contribute to the inaccuracies.

Figure 8:
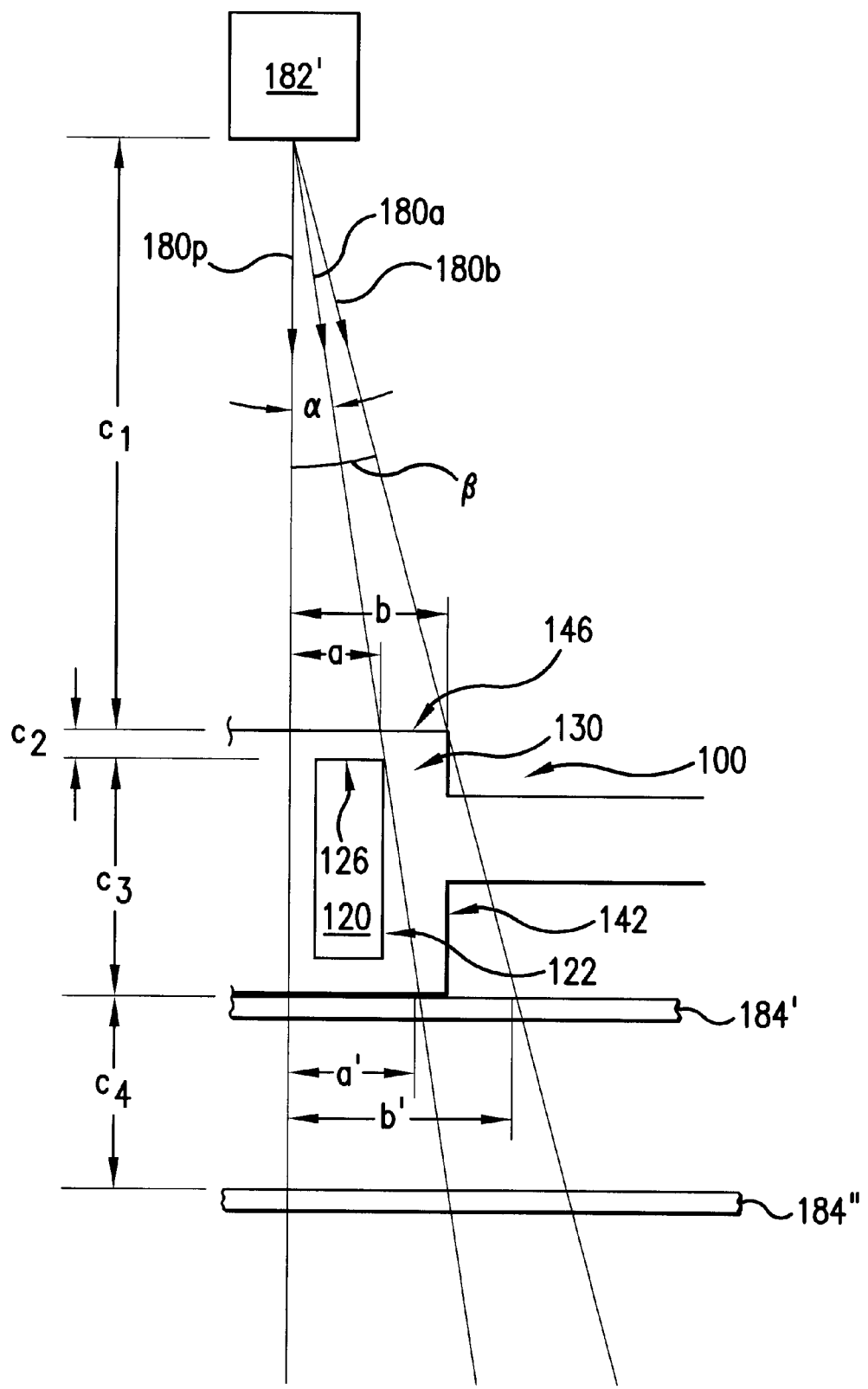
FIG. 8 is cross-sectional view of a known seal assembly receiving divergent x-rays.

FIG. 8 provides a cross-sectional view of x-ray film 184' being exposed to x-rays 180 emitted by x-ray generator 182'. Because x-ray generator 182' is a point source, the x-rays 180 emitted by x-ray generator 182' diverge as they travel. It has been discovered that this divergence can cause additional inaccuracies in the measured thickness of sealant 130 between sealant front face 142 and disk front face 122.

To characterize this inaccuracy, consider several x-rays 180 emitted by x-ray generator 182'. X-ray $180_p$ can extend perpendicular to x-ray film 184'. X-ray $180_a$ can extend to the intersection of disk front face 122 and disk circumferential face 126. X-ray $180_b$ can extend to the intersection of sealant front face 142 and sealant circumferential face 146. Angle α can be the angle between x-ray $180_p$ and $180_a$. Angle β can be the angle between x-ray $180_p$ and $180_b$. Dimension "a" can be the perpendicular distance from disk front face 122 to x-ray $180_p$, and dimension "b" can be the perpendicular distance from sealant front face 122 to x-ray $180_p$. Dimension $c_1$ can be the perpendicular distance from x-ray source 182' to sealant circumferential surface 146. Dimension $c_2$ can be the perpendicular distance from sealant circumferential surface 146 to disk circumferential surface 126. Dimension $c_3$ can be the perpendicular distance from disk circumferential surface 126 to x-ray film 184'. In an alternative arrangement, dimension $c_4$ can be the perpendicular distance from x-ray film 184' to x-ray film 184".

The actual thickness of sealant 130 between sealant front face 142 and disk front face 122 is equal to dimension b minus dimension a (i.e., b−a). However, the thickness of sealant 130 between sealant front face 142 and disk front face 122 is displayed on x-ray film 184' as dimension b' minus dimension a' (i.e. b'−a'). Knowing angles α and β, and dimensions $c_1$, $c_2$, and $c_3$, the following equations can provide the basis for finding the actual thickness:

$$a \div (c_1 + c_2) = \tan \alpha \tag{1}$$

$$b \div c_1 = \tan \beta \tag{2}$$

$$a' \div (c_1 + c_2 + c_3) = \tan \alpha \tag{3}$$

$$b' \div (c_1 + c_2 + c_3) = \tan \beta \tag{4}$$

Algebraically manipulating these equations, the following expression can relate the actual thickness to the apparent thickness:

$$(b-a) = (b'c_1 - a'c_1 - a'c_2) \div (c_1 + c_2 + c_3) \tag{5}$$

Applying such an equation to arrive at the actual thickness can require accurately determining a number of dimensions, of which dimension $c_2$ can be particularly difficult to determine using previously known non-destructive techniques such as the x-ray method described herein.

Nevertheless, an intuitive understanding of the effects of divergence can be obtained from FIG. 8. The apparent sealant thickness can depart from the actual sealant thickness when x-ray source 182' is moved toward seal assembly 100, thereby decreasing dimension $c_1$ while increasing angles α and β. Also, the apparent sealant thickness can depart from the actual sealant thickness when x-ray film 184' is moved away from seal assembly 100 by any distance of dimension $c_4$, into the arbitrary position shown by x-ray film 184". Moreover, the apparent sealant thickness can depart from the actual sealant thickness when disk front face 122 and sealant front face 142 are moved away from the line defined by x-ray $180_p$, thereby increasing angles α and β.

Figure 9:
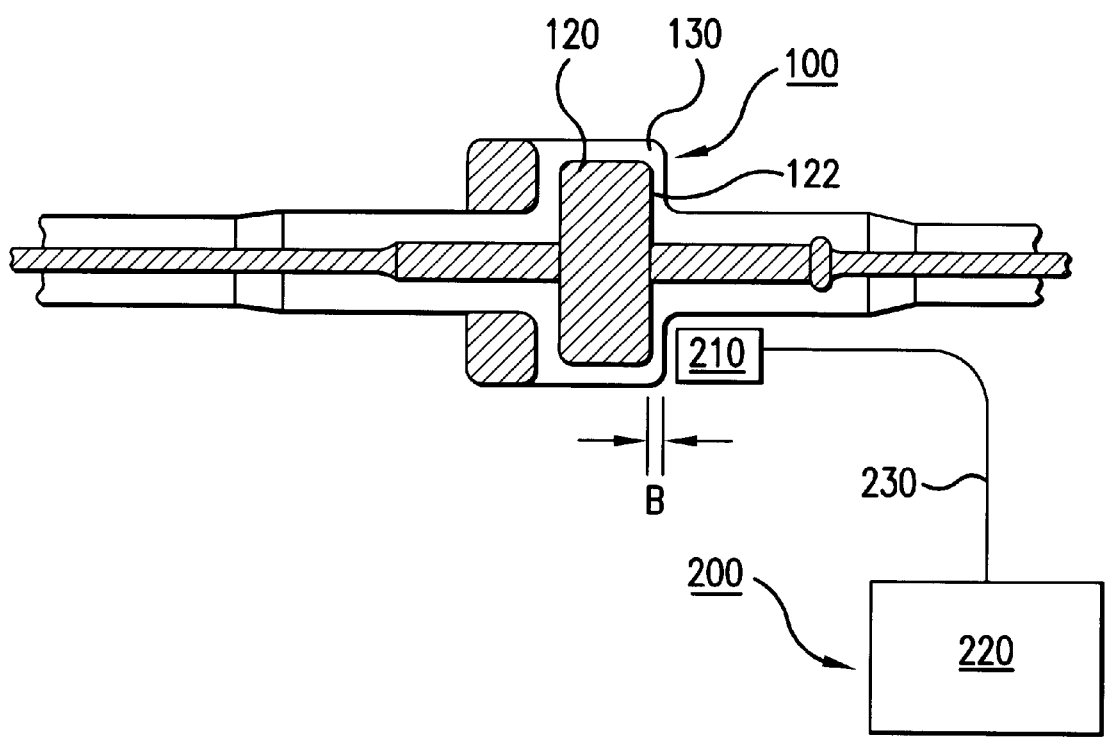
FIG. 9 is cross-sectional view of a seal assembly being thickness measured using one embodiment of the invention.

Upon discovery of these substantial causes of measurement inaccuracies, an improved measurement system and method was sought. It has been discovered that utilizing an ultrasonic measuring system can alleviate many of the disadvantages of the x-ray measurement process. FIG. 9 provides a cross sectional-view of seal assembly 100 being measured using ultrasonic measurement system 200, which can include ultrasonic transducer 210 connected to computing device 220 by connecting wiring 230. After being coupled to sealant front face 142 using water or another suitable coupling medium, and upon receipt of a signal from computing device 220, transducer 210 can transmit ultrasonic waves through dimension B, the sealant thickness beneath sealant front face 122. Those waves can bounce off disk front face 122 and return to transducer 210, which can send a corresponding signal back to computing device 220. Computing device 220 can rapidly determine the amount of time it took the ultrasonic wave to travel from transducer 210 to disk 120 and return to transducer 210. Thus, knowing the speed of sound through the material of sealant 130 at the particular frequency generated by the transducer, either computing device 220 or its operator can determine the distance that the ultrasonic waves traveled, which corresponds to the sealant thickness at the specific location on sealant front face 142.

Figure 10:
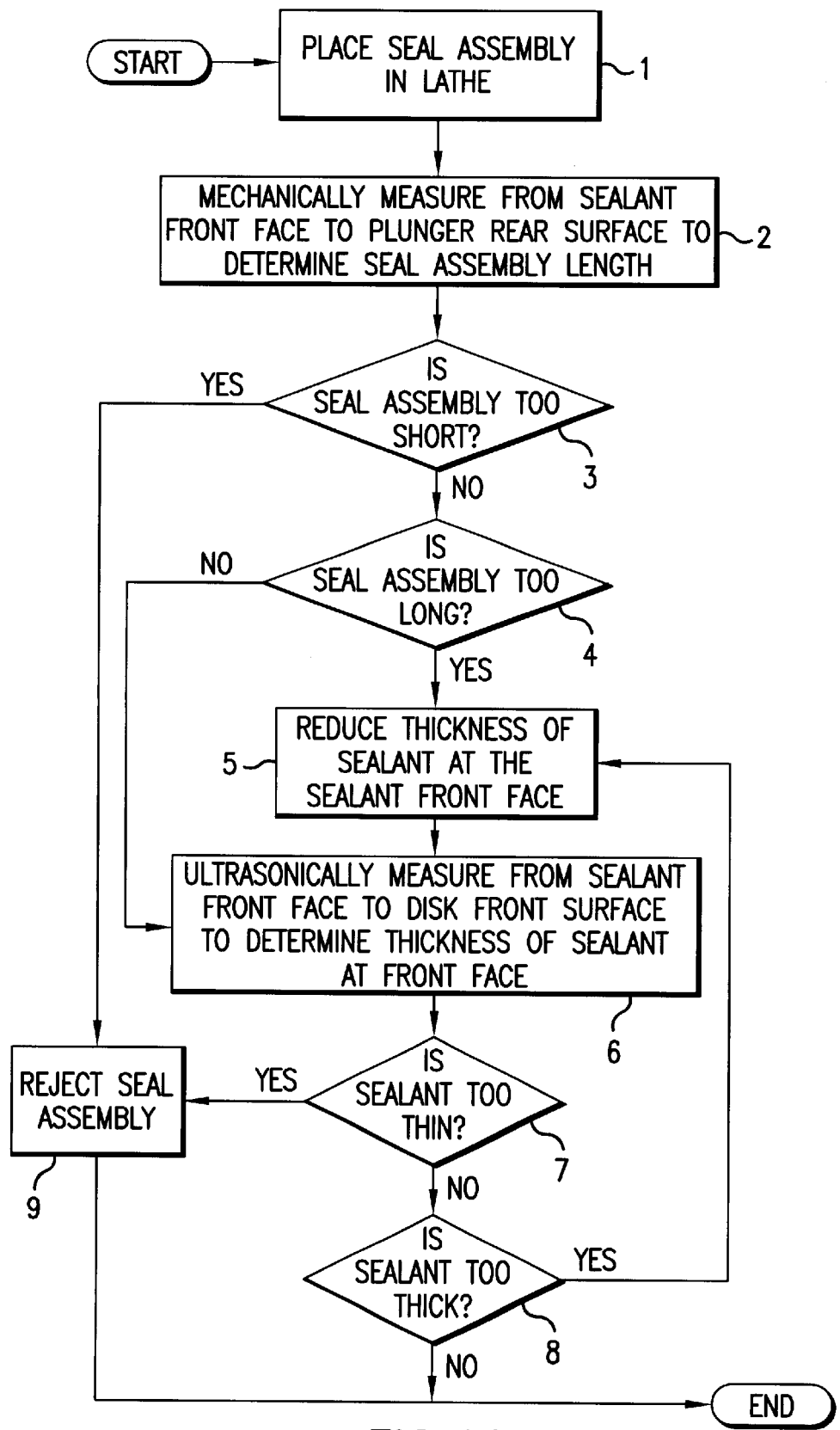
FIG. 10 is flowchart of one embodiment of a method of the invention.

FIG. 10 provides a flowchart illustrating a method of using an ultrasonic measurement system 200. Prior to beginning this method, a seal assembly can be obtained and visually inspected for obvious defects.

At step 1, the seal assembly can be mounted in a lathe and aligned with the lathe. The alignment can include aligning the seal assembly's longitudinal axis coaxially with the lathe's turning axis. The alignment can also include aligning the seal assembly's plunger rear face perpendicularly with the lathe's turning axis.

At step 2, a mechanical measurement can be made from the sealant front face to the plunger rear face to determine the seal assembly length. This mechanical measurements can be made with calipers, a scale, or another well known mechanical measuring device. This measurement can be made at more than one location on the sealant front face. Significant differences between the lengths measured at the various locations can help indicate, identify, or verify a number of potentially problematic situations, including:

(a) the plunger rear face is not smooth;

(b) the plunger rear face is not level;

(c) the plunger rear face is not perpendicular to the longitudinal axis of the plunger;

(d) the disk front face is not smooth;

(e) the disk front face is not level;

(f) the disk front face is not perpendicular to the longitudinal axis of the disk;

(g) the longitudinal axis of the disk is offset from the longitudinal axis of the plunger;

(h) the longitudinal axis of the disk is not parallel to the longitudinal axis of the plunger;

(i) the sealant front face is not smooth;

(j) the sealant front face is not level;

(k) the sealant front face is not perpendicular to the longitudinal axis of the plunger; and (l) the sealant front face is not parallel to the plunger rear face.

Alternatively, the mechanical measurement of step 2 can occur before step 1.

At step 3, a determination can be made regarding whether the seal assembly length is too short at any location versus the specified length range for the seal assembly length. If the seal assembly length is too short, at step 9, the seal assembly can be rejected.

If the seal assembly length is not too short, at step 4, a determination can be made regarding whether the seal assembly length is too long at any location versus the specified length range for the seal assembly length. If the seal assembly length is too long, at step 5, the lathe can be utilized to reduce the length of the seal assembly by removing sealant at and beneath the sealant front face. When the lathe is utilized, a cut can be made in the sealant front face that is deep enough to expose new sealant on the entire sealant front face.

If the seal assembly length is not too long, at step 6, an ultrasonic measurement system can be used to measure the distance from the sealant front face to the disk front face to determine the sealant thickness. This measurement can be made at more than one location on the sealant front face. Significant differences between the thicknesses measured at the various locations can help indicate, identify, or verify a number of potentially problematic situations, including:

(a) the disk is not circular;

(b) the disk front face is not smooth;

(c) the disk front face is not level;

(d) the disk front face is not perpendicular to the longitudinal axis of the disk;

(e) the longitudinal axis of the disk is offset from the longitudinal axis of the plunger;

(f) the longitudinal axis of the disk is not parallel to the longitudinal axis of the plunger;

(g) the sealant front face is not circular;

(h) the sealant front face is not smooth;

(i) the sealant front face is not level;

(j) the sealant front face is not perpendicular to the longitudinal axis of the disk; and (k) the longitudinal axis of the sealant front face is offset from the longitudinal axis of the disk;

(l) the sealant front face is not parallel to the disk front face.

(m) the sealant is not completely adhered to the disk front face.

At step 7, a determination can be made regarding whether the sealant is too thin at any location versus the specified thickness range for the sealant between the sealant front face and the disk front face. If the sealant is too thin, at step 9, the seal assembly can be rejected.

If the sealant is not too thin, at step 8, a determination can be made regarding whether the sealant is too thick at any location versus the specified thickness range for the sealant. If the sealant is too thick, the process can return to step 5, where the lathe can be utilized to reduce the thickness by removing sealant at and beneath the sealant front face. However, beforehand the lathe is energized, a determination can be made of the depth of cut that will reduce the sealant thickness to approximately the center of the specified thickness range. The lathe's cutting tool can then be adjusted accordingly.

If the determination of step 8 finds that the sealant is not too thick, the process can be ended.

Numerous advantages have been discovered with utilizing an ultrasonic measurement system rather than the known x-ray method. For instance, as its primary measuring instrument, the ultrasonic measurement system can employ a transducer rather than the emitter/recorder combination of the x-ray method. By implementing a single primary measuring instrument, the ultrasonic measurement system can position its transducer substantially parallel to the dimension being measured, rather than perpendicular to it. Thus, the shadow effect can be eliminated, thereby potentially substantially improving the accuracy of the measurement.

Comparisons of measurements gathered using the known x-ray method with those gathered using the ultrasonic method verify this discovery. For the ultrasonic method, a thickness gauging transducer, manufactured by Krautkramer Branson, was employed.

Using the x-ray method to measure the thickness of the sealant between the sealant front face and the disk front face for 85 seal assemblies, an average thickness of 61.5±1.7 units was measured. However, when using the ultrasonic method, an average thickness of 59.5±1.5 units was measured. Using a destructive mechanical technique, the average thickness was determined to be 59.3±1.0 units. Thus, the ultrasonic method was found to provide more accurate, and more repeatable measurements than the x-ray method.

Additional unexpected and previously unappreciated advantages have also been discovered with utilizing an ultrasonic measurement system rather than the known x-ray method. For example, the ultrasonic sound waves can have less distance to travel than the x-rays, and therefore can be less susceptible to inaccuracies due to misalignments and divergence. Moreover, several days can be required to measure and adjust the dimensions of seal assembly 100 using the x-ray/machining process. However, ultrasonic measurement system 200 can provide rapid determinations of the sealant thickness, often resulting in completing the entire measurement/adjustment process for seal assembly 100 within several hours of starting, thereby also reducing the cost of the measurement process. Even more time and cost can be saved because transducer 210 does not necessarily require that seal assembly 100 be repeatedly dismounted from, and potentially re-mounted on, the lathe. Leaving seal assembly 100 mounted on the lathe can also reduce the potential for misalignments between the axis of seal assembly 100 and the lathe's turning axis, and can reduce the likelihood that seal assembly will be dropped and damaged.

In addition, ultrasonic measurement system 200 can be easier to calibrate than the known x-ray method. Using ultrasonic measurement system 200, a seal assembly can be selected and a gap can be cut that extends from sealant front face 142 to disk front face 122. The actual value of dimension B can be carefully measured using a mechanical measuring device, such as calipers, a micrometer, or a scale. Knowing the actual value of dimension B, the selected seal assembly can serve as a calibration standard. Transducer 210 can be periodically calibrated by positioning it near the gap of this calibration standard, measuring dimension B, and adjusting the value reported by ultrasonic measurement system 200 until that reported value matches the previously established actual value for dimension B. In addition, the calibration standard can incorporate values of B at both the high end of the tolerance band and the low end. Finally, the calibration standard can be made from sealant from the same process lot and using the same molding procedures as each seal assembly 100 for which it will serve as the calibration standard. Thus, the calibration standard can be used to calibrate the before, during, and after each seal assembly is measured ultrasonic measurement system 200.

Moreover, because transducer 210 can cover a small percentage of sealant front face 142, transducer 210 can be positioned on numerous locations on sealant front face 142 to provide thickness measurements at each of those numerous locations. Thus, rather than measuring only an average thickness of sealant 130, ultrasonic measurement system 200 can measure the actual thickness beneath a number of locations on sealant front face 142. If the thickness measured for any of these locations is below the specified thickness range, seal assembly 100 can be rejected. Otherwise, significant differences between the measured thicknesses can help indicate, identify, or verify a number of potentially problematic situations, described above. As appropriate, seal assembly 100 can be accepted or rejected, or the thickness of sealant 130 can be reduced.

Figure 1:
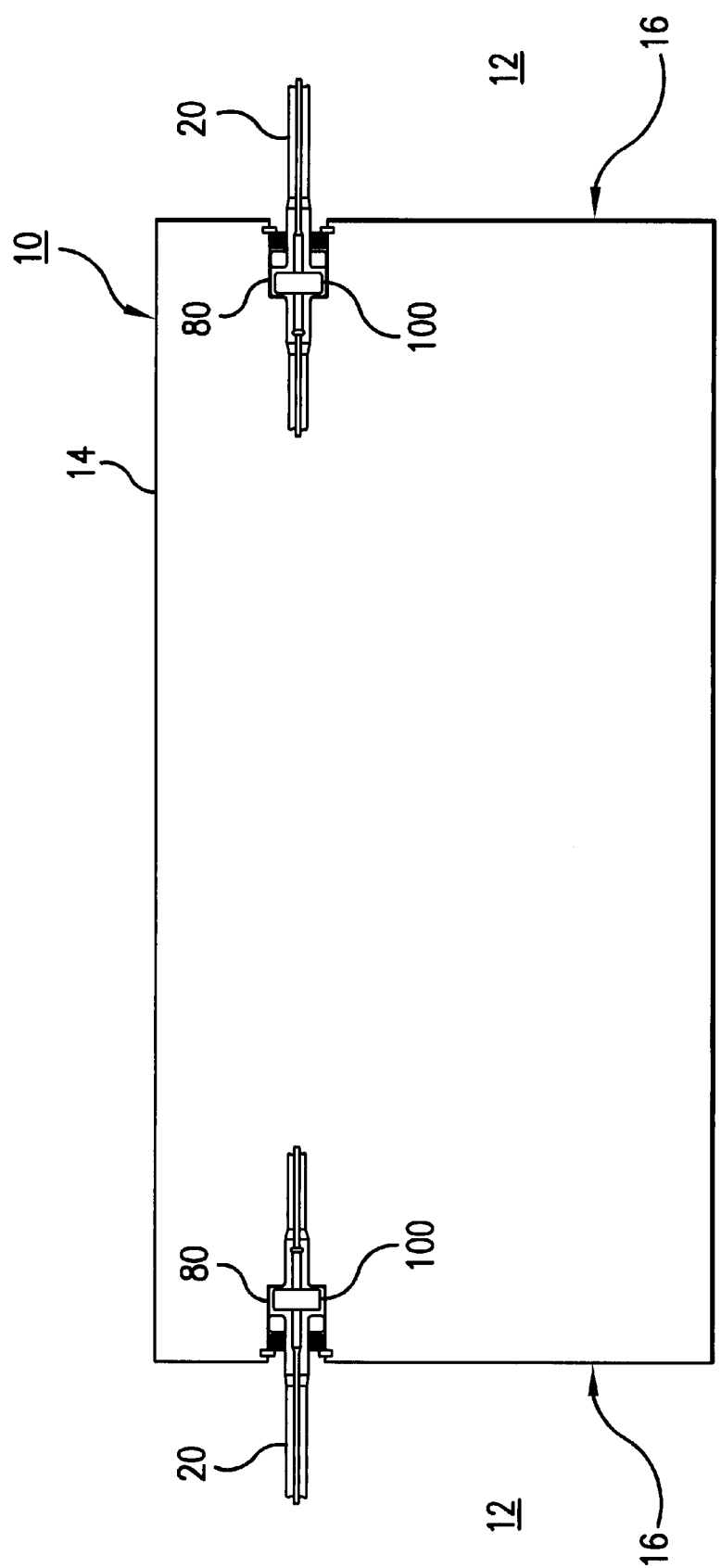
FIG. 1 is a cross-sectional view of a known submarine fiber optic transmission device.
Figure 2:
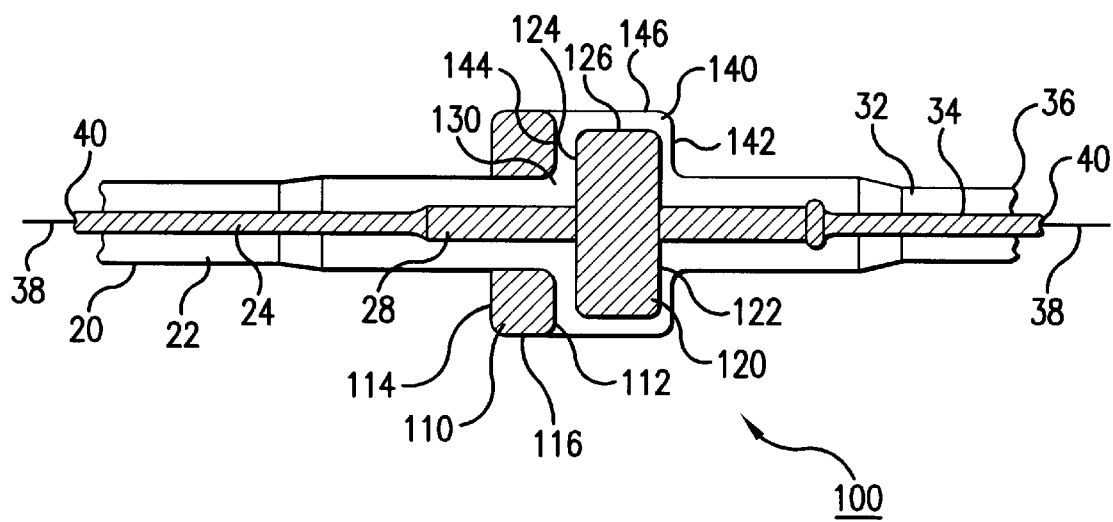
FIG. 2 is a cross-sectional view of a known seal assembly.
Figure 3:
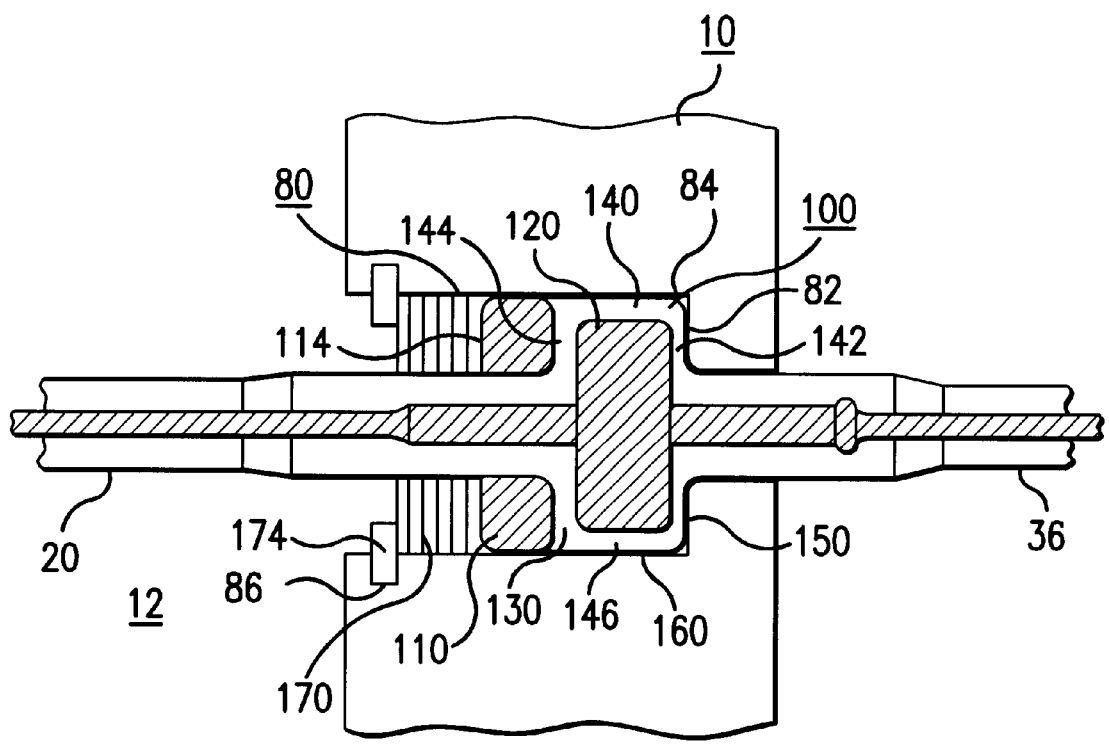
FIG. 3 is a cross-sectional view of a known seal assembly installed in a seal well.
Figure 4:
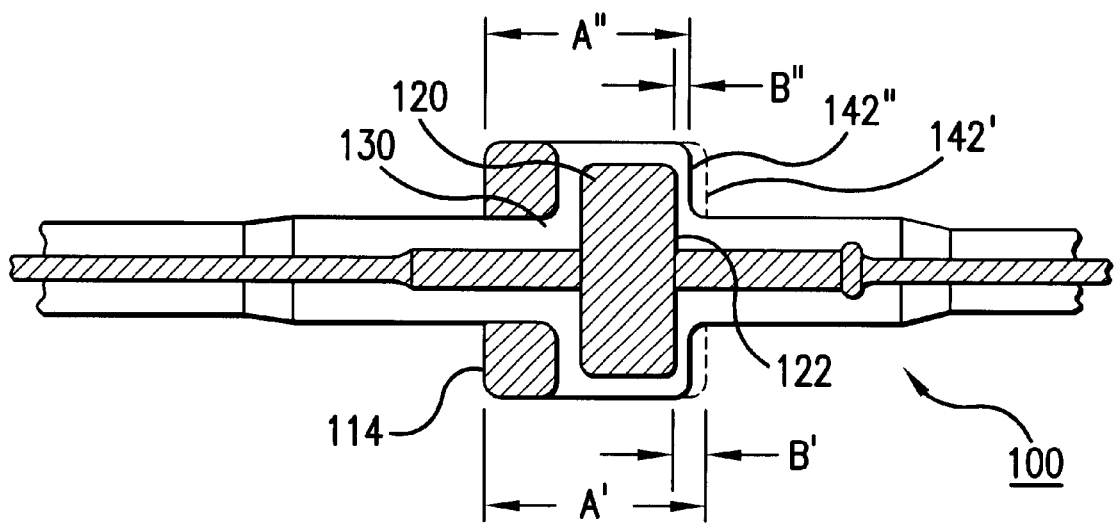
FIG. 4 is a cross-sectional view of a known seal assembly showing important dimensions.
Figure 5:
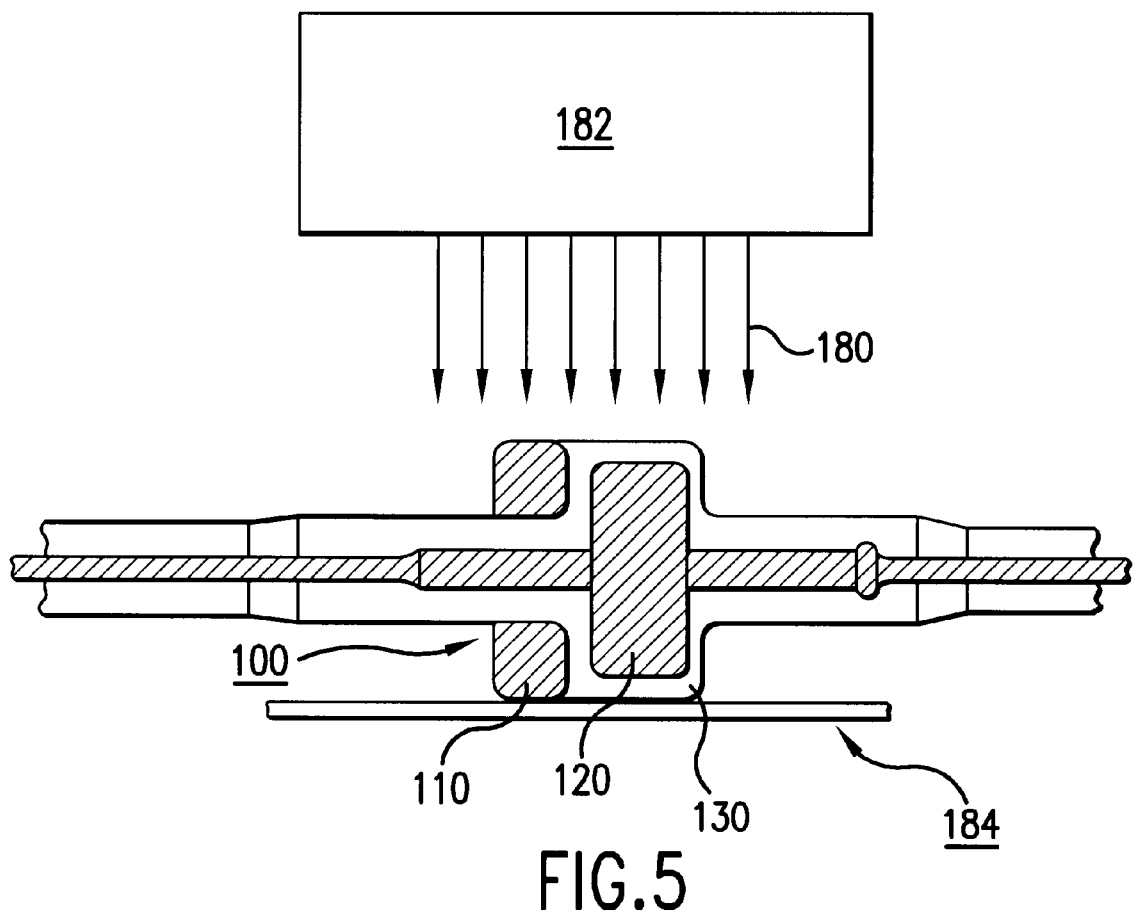
FIG. 5 is a cross-sectional view of a known seal assembly being thickness measured using x-rays.
Figure 6:
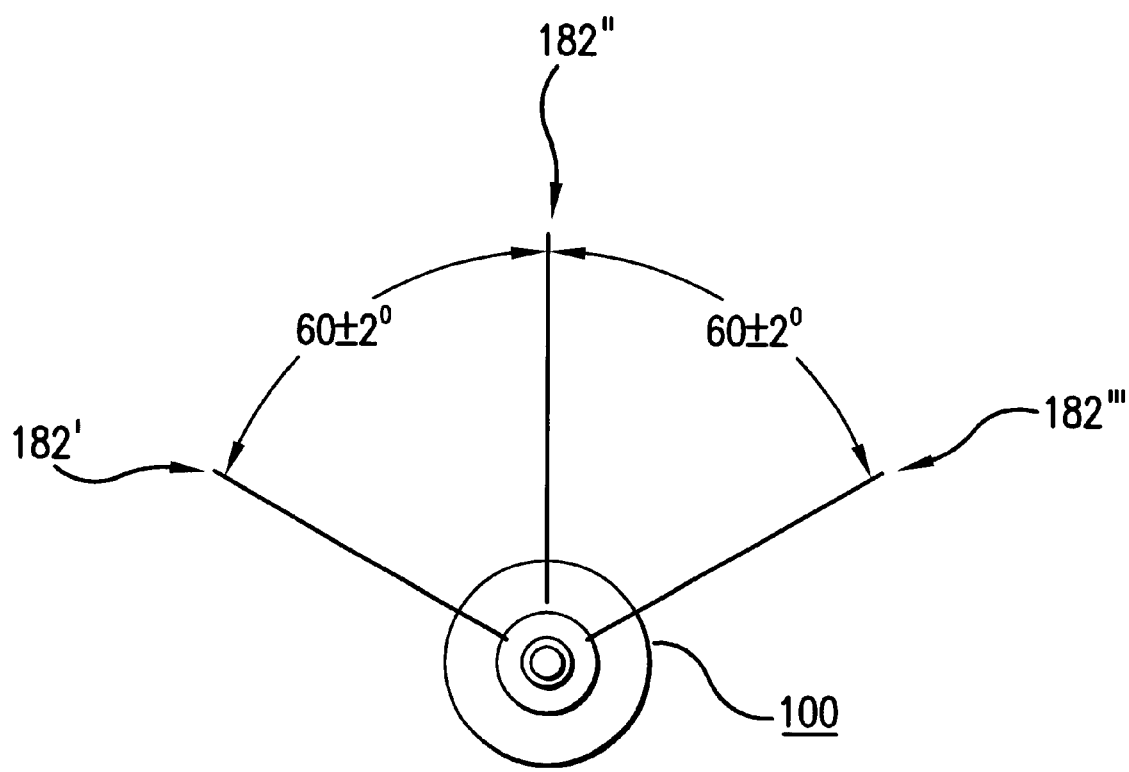
FIG. 6 is end view of a known seal assembly being thickness measured using x-rays.

Whereas embodiments of the present invention have been described as being utilized in the context of measuring the thickness of the sealant beneath the sealant front face, the present invention is not limited to only being practiced in this context. Embodiments of the present invention have utility for measuring thicknesses of other dimensions of the seal assembly. For example, referring to FIG. 2, in an alternative embodiment, ultrasonic measurement system 200 can be used with transducer 212 (not shown in FIG. 2), which can have a different form and construction than that of transducer 210. Transducer 212 can be placed on sealant circumferential face 146 and faced toward the apparent axis of seal assembly 100. This positioning can provide a measurement of the annular thickness between sealant circumferential face 146 and disk circumferential face 126. By moving transducer 212 to various locations on sealant circumferential face 146, the annular thickness can be determined for each of those locations. Significant differences between the thicknesses measured at the various locations can help indicate, identify, or verify a number of potentially problematic situations, including:

(a) the disk is not circular;
(b) the disk circumferential face is not smooth circumferentially;
(c) the disk circumferential face is not level longitudinally;
(d) the disk circumferential face is not parallel to the longitudinal axis of the disk;
(e) the longitudinal axis of the disk is offset from the longitudinal axis of the plunger;
(f) the longitudinal axis of the disk is not parallel to the longitudinal axis of the plunger;
(g) the sealant circumferential face is not smooth circumferentially;
(h) the sealant circumferential face is not level longitudinally;
(i) the sealant circumferential face is not parallel to the longitudinal axis of the disk;
(j) the longitudinal axis of the sealant circumferential face is offset from the longitudinal axis of the disk; and
(k) the sealant is not completely adhered to the disk circumferential face.

In an another alternative embodiment, the process of FIG. 10 can be modified by skipping steps 2–5 so that the seal assembly length is not measured. In yet another alternative embodiment, rather than replacing the x-ray measuring process with the ultrasonic measuring process, the x-ray measuring process can be augmented with the ultrasonic measuring process by replacing only one set of x-rays with a one or more ultrasonic measurements.

The disclosed embodiments are illustrative of the various ways in which the present invention may be practiced. Other embodiments can be implemented by those skilled in the art without departing from the spirit and scope of the present invention. For example, the ultrasonic measurement system can also be used to identify defects, such as debris or contaminants, in the sealant between a face of the sealant and a surface of the disk, and where the sealant interfaces with the internal and external secondary jackets.

What is claimed is:

1. A method for forming a seal structure, comprising the steps of:
    providing a substrate constructed of a material capable of reflecting ultrasonic waves, said substrate having a sealant disposed on a surface thereof collectively forming therewith an integral seal assembly;
    ultrasonically measuring a thickness of the seal assembly between a face of the sealant and a surface of the substrate; and
    reducing the thickness of the sealant if the thickness of the sealant is greater than a first predetermined value.

2. The method of claim 1, further comprising the step of:
    rejecting the seal assembly if the thickness of the sealant is less than a second predetermined value.

3. The method of claim 1, wherein said ultrasonically measuring step is performed at a plurality of locations on the face.

4. The method of claim 1, wherein the face is a front face.

5. The method of claim 1, wherein the surface is a front surface.

6. The method of claim 1, wherein the face is a circumferential face.

7. The method of claim 1, wherein the surface is a circumferential surface.

8. The method of claim 1, further comprising the step of:
    placing an ultrasonic transducer on the face.

9. The method of claim 1, further comprising the step of:
coupling an ultrasonic transducer to the face using water as a coupling medium.

10. The method of claim 1, further comprising the step of:
placing an ultrasonic transducer on the face using water as a coupling medium, a resulting surface tension between the transducer and the face adhering the transducer to the face.

11. The method of claim 1, wherein said step of reducing the thickness of the sealant is performed using a lathe.

12. The method of claim 1, wherein said step of ultrasonically measuring is performed while the seal assembly is mounted on a lathe.

13. The method of claim 1, wherein the seal assembly includes a plunger attached to the sealant, further comprising the steps of:
mechanically measuring a seal assembly length between a rear surface of the plunger and a front face of the sealant; and
reducing the thickness of the sealant if the seal assembly length is greater than a third predetermined value.

14. The method of claim 1, wherein the seal assembly includes a plunger attached to the sealant, further comprising the steps of:
mechanically measuring a seal assembly length between a rear surface of the plunger and a front face of the sealant; and
rejecting the seal assembly if the seal assembly length is less than a fourth predetermined value.

15. The method of claim 13, wherein said mechanically measuring step is performed at a plurality of locations on the front face.

16. The method of claim 14, wherein said mechanically measuring step is performed at a plurality of locations on the front face.

17. A method for monitoring dimensional accuracy of a seal assembly, the seal assembly comprising a sealant dimensioned to at least partially surround a substrate formed of a material capable of reflecting ultrasonic waves, comprising the steps of:
placing the sealant in registration with the substrate;
ultrasonically measuring a thickness of the seal assembly between a face of the sealant and a surface of the substrate; and
adjusting the thickness of the sealant in accordance with a predetermined thickness value.

18. A method for assuring a thickness of a sealant, the sealant surrounding a substrate to define a seal assembly, comprising the steps of:
ultrasonically measuring a thickness of the sealant between a face of the sealant and a surface of the substrate; and
reducing the thickness of the sealant if the thickness of the sealant is greater than a first predetermined value.

* * * * *